(12) United States Patent
Miyano et al.

(10) Patent No.: US 8,416,474 B2
(45) Date of Patent: Apr. 9, 2013

(54) PAPER FEED PORT AND IMAGE READING APPARATUS

(75) Inventors: Shogo Miyano, Ishikawa (JP); Keisuke Kimura, Ishikawa (JP)

(73) Assignee: PFU Limited (JP)

( * ) Notice: Subject to any disclaimer, the term of this patent is extended or adjusted under 35 U.S.C. 154(b) by 371 days.

(21) Appl. No.: 12/797,972

(22) Filed: Jun. 10, 2010

(65) Prior Publication Data

US 2011/0176185 A1 Jul. 21, 2011

(30) Foreign Application Priority Data

Jan. 15, 2010 (JP) ................................ 2010-007357

(51) Int. Cl.
*H04N 1/04* (2006.01)
(52) U.S. Cl.
USPC ............ 358/496; 358/498; 358/483; 358/408

(58) Field of Classification Search .................. 358/496, 358/498, 483, 408
See application file for complete search history.

(56) References Cited

U.S. PATENT DOCUMENTS 7,973,985 B2 * 7/2011 Tan et al. ...................... 358/496

FOREIGN PATENT DOCUMENTS

| JP | 2566650 B2 | 12/1996 |
| JP | 10-007292 A | 1/1998 |
| JP | 2002-068534 A | 3/2002 |

* cited by examiner

*Primary Examiner* — Houshang Safaipour
(74) *Attorney, Agent, or Firm* — Lowe Hauptman Ham & Berner, LLP (57) ABSTRACT

In a paper feed port configured to feed a sheet-like medium to a conveyance path, an inclined surface is provided at both ends of an opening into which the medium to be fed is inserted, with respect to a width direction crossing a paper feed direction of the medium, such that an abutting angle between the inclined surface and a leading end of the medium on a downstream side in the paper feed direction is an acute angle.

8 Claims, 6 Drawing Sheets

FIG.12

PAPER FEED PORT AND IMAGE READING APPARATUS

CROSS-REFERENCE TO RELATED APPLICATIONS

This application is based upon and claims the benefit of priority from Japanese Patent Application No. 2010-007357, filed Jan. 15, 2010, the entire contents of which are incorporated herein by reference.

BACKGROUND OF THE INVENTION

1. Field of the Invention

The present invention relates to a paper feed port and an image reading apparatus.

2. Description of the Related Art

Conventional paper feed ports that feed sheet-like media such as sheets of paper and conventional image reading apparatuses that read images on media fed from such paper feed ports have been disclosed. For example, Japanese Patent No. 2566650 discloses an image forming apparatus that has a manual conveyance path for conveying, from a direction orthogonal to a conveyance path of a main unit, a sheet material manually inserted from a manual port (a paper feed port) provided at the front of an apparatus. Further, Japanese Laid-open Patent Publication No. 2002-68534 discloses an image forming apparatus in which a guiding member, which can press from above in an approximate full width direction a sheet of paper or an original to a portion where the sheet or the original is inserted into a main unit of the image forming apparatus, is provided protruded. Furthermore, Japanese Laid-open Patent Publication No. 10-7292 discloses a manual insertion guide provided with an upper guiding member facing a lower guiding member with a certain space from the lower guiding member that supports from underneath a manually inserted sheet of paper or original and being shaped so as to retreat backwards as both ends are approached from a front edge.

In the image forming apparatuses disclosed in Japanese Patent No. 2566650 and Japanese Laid-open Patent Publication No. 2002-68534 and the manual insertion guide disclosed in Japanese Laid-open Patent Publication No. 10-7292, for a case where a so-called corner curl is generated in an original for example, further improvements to be able to feed the original more infallibly and easily have been desired.

SUMMARY OF THE INVENTION

It is an object of the present invention to at least partially solve the problems in the conventional technology.

According to an aspect of the present invention, a paper feed port is configured to feed a sheet-like medium to a conveyance path, wherein an inclined surface is provided at both ends of an opening into which the medium to be fed is inserted, with respect to a width direction crossing a paper feed direction of the medium, such that an abutting angle between the inclined surface and a leading end of the medium on a downstream side in the paper feed direction is an acute angle.

According to another aspect of the present invention, an image reading apparatus includes the paper feed port; and a reader that reads an image on the medium fed from the paper feed port.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a paper feed port and an image reading apparatus according to the present invention will be explained below in detail with reference to the accompanying drawings. The present invention is not limited to the embodiments. In addition, structural elements in the following embodiments include those easily replaceable by those skilled in the art, or those substantially the same.

In the following explanation, unless otherwise specified, a direction in which a medium is fed to the image reading apparatus is referred to as "paper feed direction", a direction crossing, here, orthogonal to the paper feed direction is referred to as "width direction", and a direction orthogonal to the paper feed direction and the width direction is referred to as "height direction". The paper feed direction corresponds to a sub-scanning direction of the image reading apparatus, that is, a length direction of the medium, the width direction corresponds to a main scanning direction of the image reading apparatus, that is, the width direction of the medium, and the height direction corresponds to a thickness direction of the medium.

Figure 1:
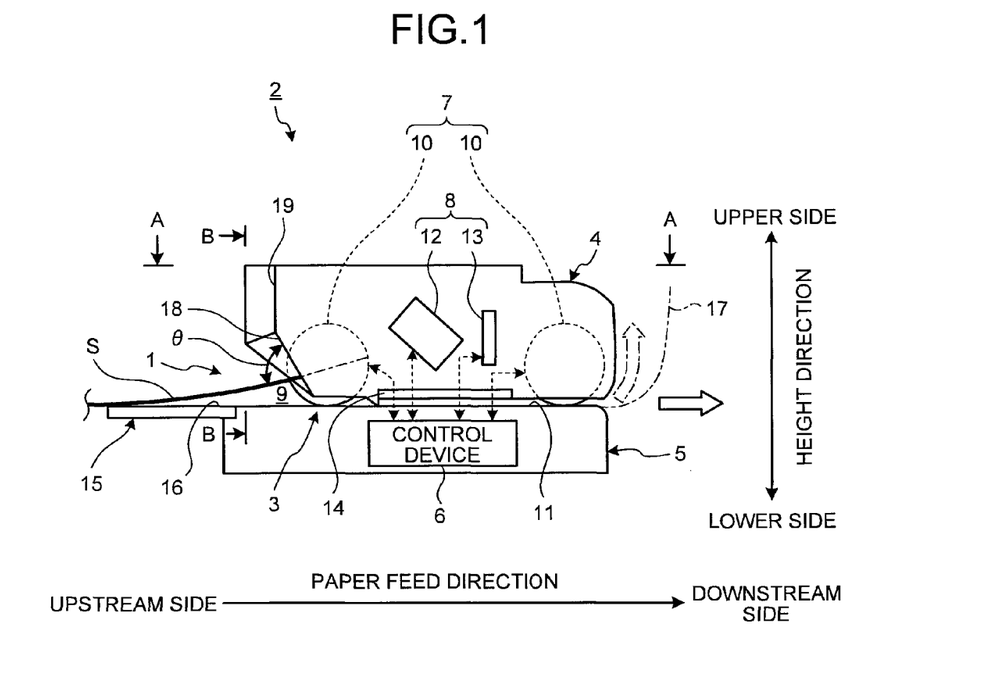
FIG. 1 is a schematic structural diagram of an example of an image reading apparatus according to a first embodiment of the present invention.
Figure 2:
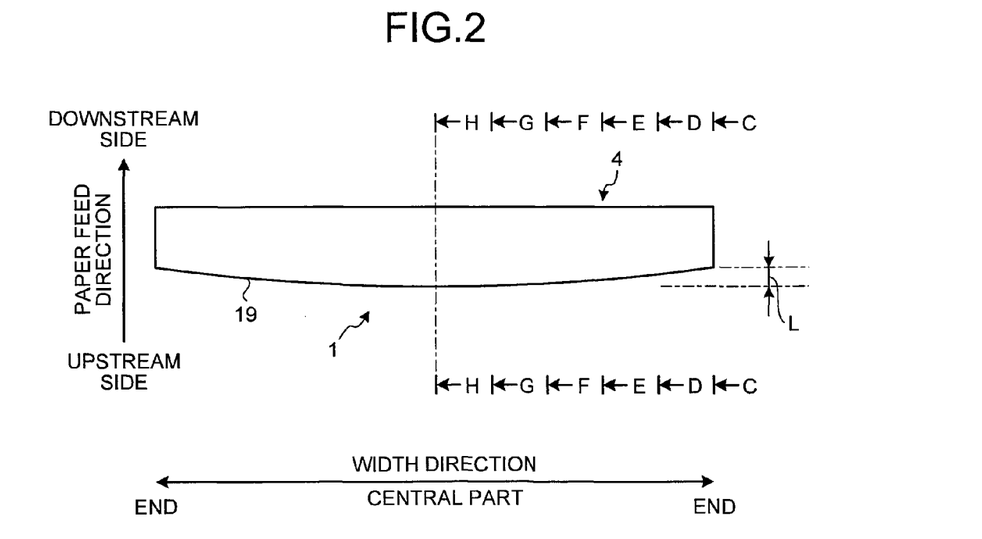
FIG. 2 is a view in the direction of arrows A-A of a reader main unit depicted in FIG. 1.
Figure 3:
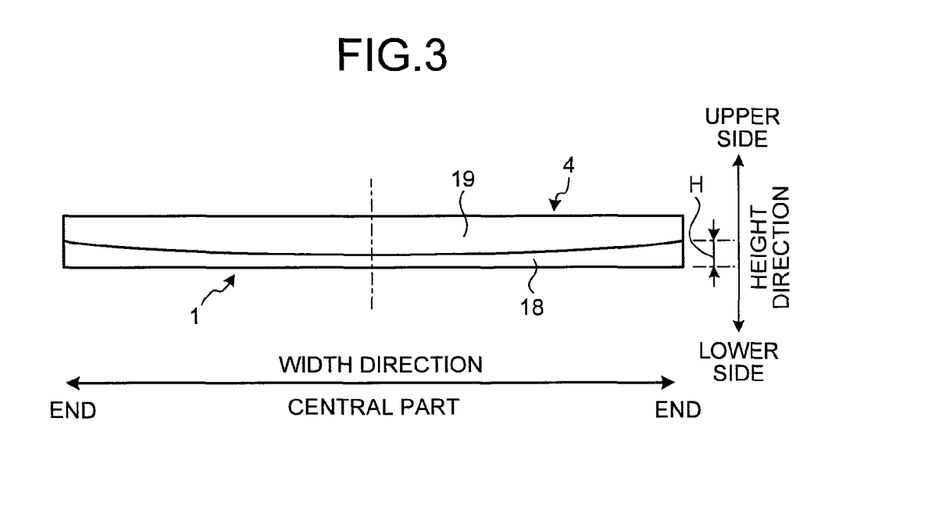
FIG. 3 is a view in the direction of arrows B-B of the reader main unit depicted in FIG. 1.
Figure 4:
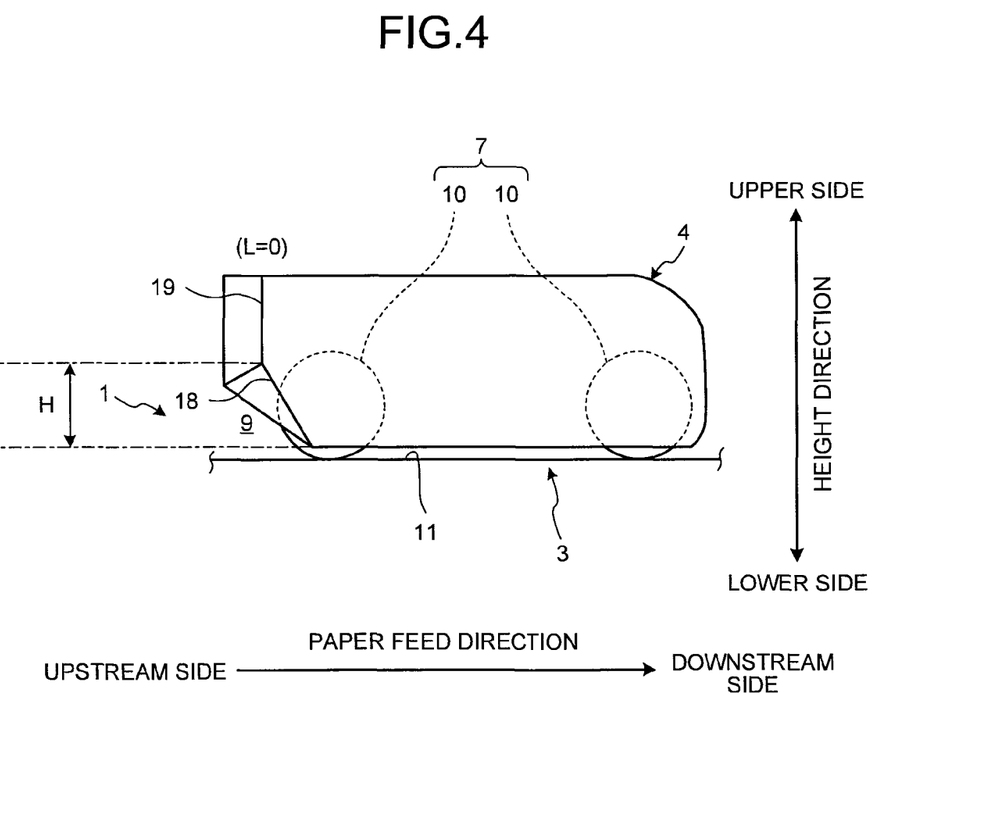
FIG. 4 is a view in the direction of arrows C-C of the reader main unit depicted in FIG. 2.
Figure 5:
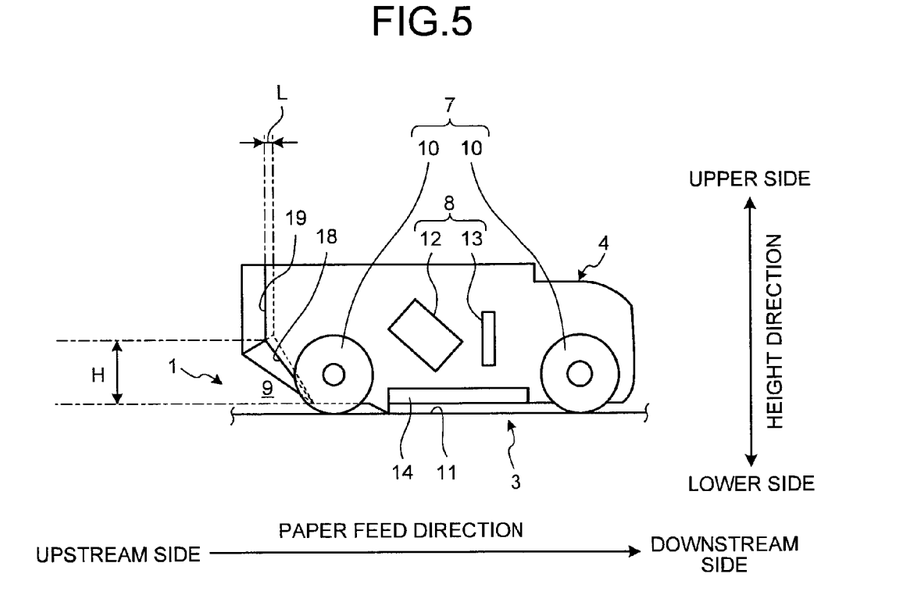
FIG. 5 is a cross section along a line D-D of the reader main unit depicted in FIG. 2.
Figure 6:
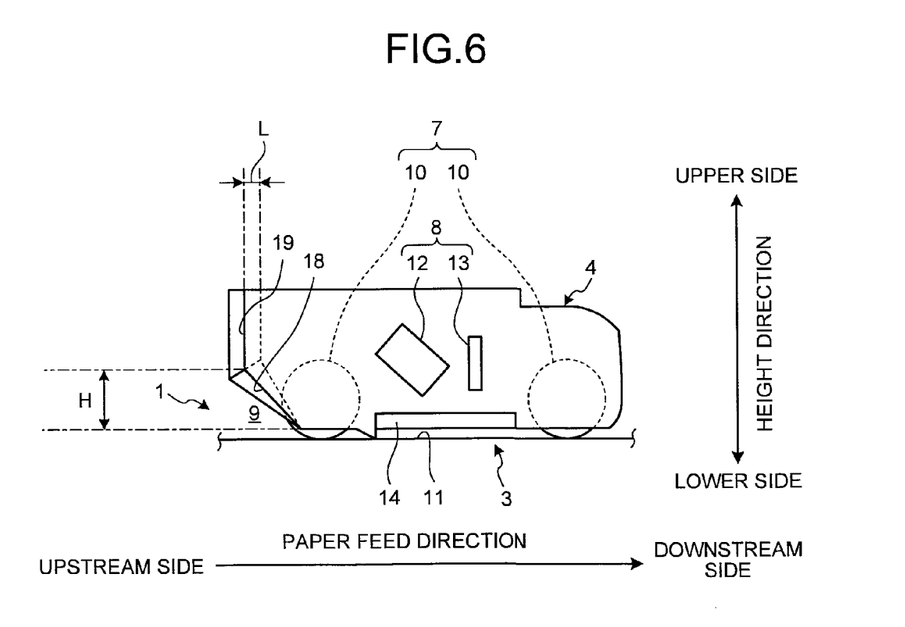
FIG. 6 is a cross section along a line E-E of the reader main unit depicted in FIG. 2.
Figure 7:
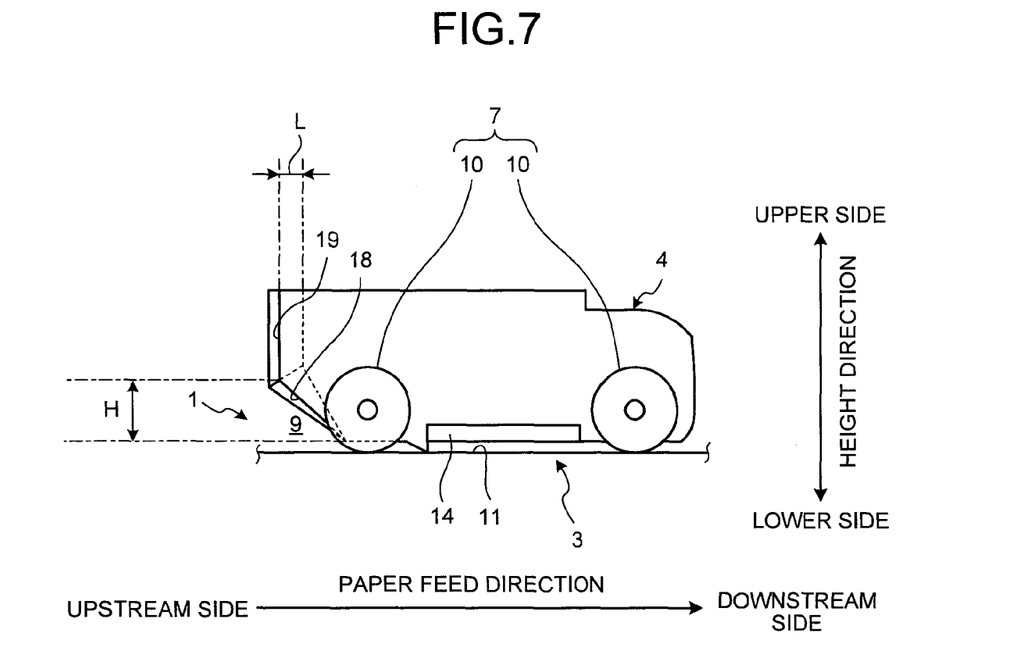
FIG. 7 is a cross section along a line F-F of the reader main unit depicted in FIG. 2.
Figure 8:
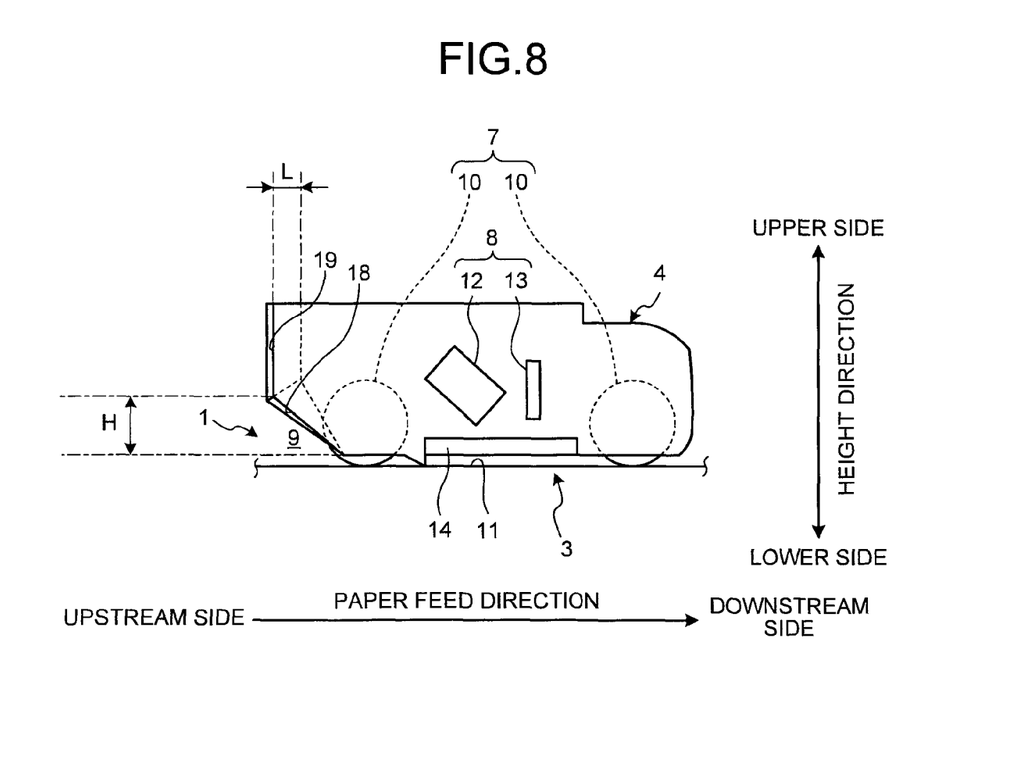
FIG. 8 is a cross section along a line G-G of the reader main unit depicted in FIG. 2.
Figure 9:
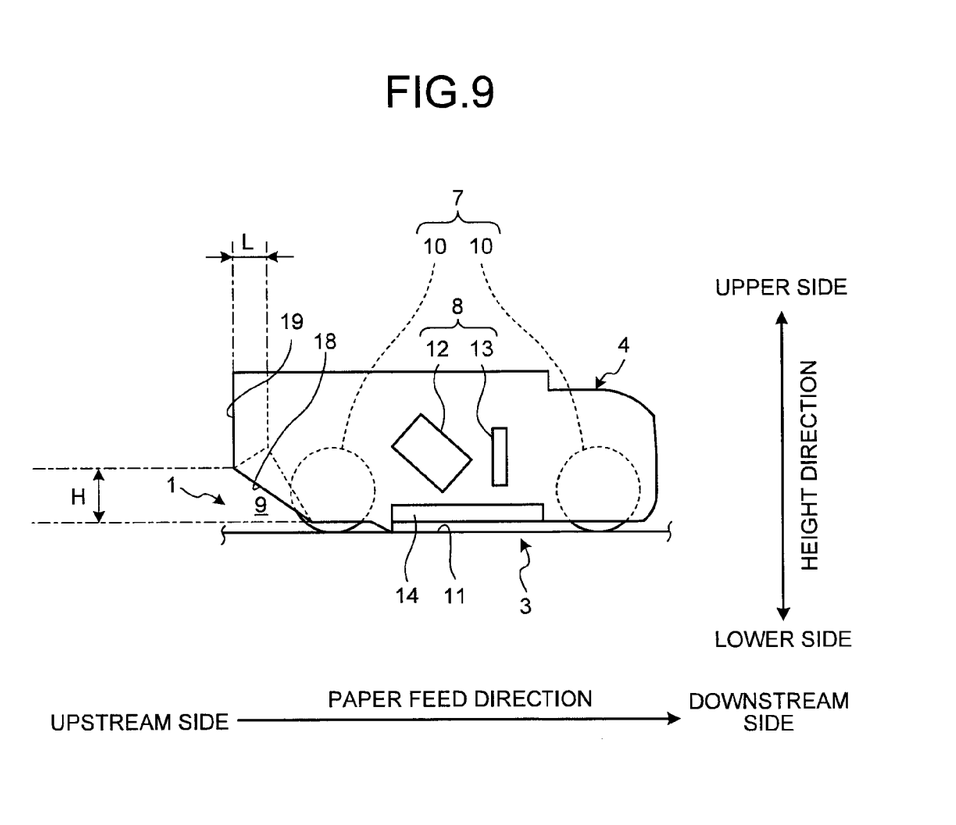
FIG. 9 is a cross section along a line H-H of the reader main unit depicted in FIG. 2.

A paper feed port 1 according to the present embodiment is applied to an image reading apparatus 2 as depicted in FIG. 1, and feeds an original S, which is a sheet-like medium having a predetermined size, such as a sheet of paper, to a conveyance path 3. The image reading apparatus 2 is applied to a device such as an image scanner, a copying machine, a facsimile machine, or a character recognition apparatus. The image reading apparatus 2 includes the paper feed port 1, the conveyance path 3, a reader main unit 4, an original table 5, and a control device 6. The reader main unit 4 includes a conveying device 7, and an optical unit 8, which is a reader. The image reading apparatus 2 reads an image on the original S fed from the paper feed port 1 and carried by the conveying device 7, using the optical unit 8.

The paper feed port 1 feeds the sheet-like original S to the conveyance path 3, and includes an opening 9 into which the original S to be fed is inserted. In other words, the paper feed port 1 feeds to the conveyance path 3 the original S with an image to be read by the optical unit 8. Typically, the paper feed port 1 is for manually feeding the original S by a user to the conveyance path 3 of the image reading apparatus 2. In this case, the user inserts an end of the original S into the opening 9 of the paper feed port 1.

The conveyance path 3 is a passage to carry the original S fed from the paper feed port 1. The conveyance path 3 is formed between the reader main unit 4 and the original table 5 with respect to the height direction.

External shapes of the reader main unit 4 and the original table 5 are both rectangularly columnar and long in the width direction. The reader main unit 4 and the original table 5 are provided facing each other in the height direction, and the conveyance path 3 is formed between the opposite surfaces along the height direction. An outer circumferential surface of a roller 10 (described later) is exposed from a surface of the reader main unit 4 that is opposite to the original table 5 with respect to the height direction (from a lower surface in the height direction). On the original table 5, a conveying surface 11 for comparting the conveyance path 3 is formed on a surface opposite to the reader main unit 4 with respect to the height direction (on an upper surface in the height direction). The outer circumferential surface of the roller 10 and the conveying surface 11 face each other vertically in the conveyance path 3 along the height direction.

The control device 6 includes a microcomputer as a central element, and controls each part of the image reading apparatus 2. The control device 6 is, for example, provided internally inside a housing of the original table 5.

The conveying device 7 conveys the original S fed from the paper feed port 1 to the conveyance path 3 toward the optical unit 8, and includes the roller 10. As described above, the roller 10 is provided inside the housing of the reader main unit 4 so that a part of the outer circumferential surface is exposed to the conveyance path 3. The roller 10 is provided plurally. The roller 10 is driven to be rotated by power being transmitted from a drive member including a drive source such as a motor. In the conveying device 7, the drive member is driven under control by the control device 6 and the power is transmitted to the roller 10 via a gear, a drive shaft, and the like, thereby rotating the roller 10. The conveying device 7 holds the original S between the outer circumferential surface of the roller 10 and the conveying surface 11, and as the roller 10 is driven to be rotated, the original S is conveyed on the conveyance path 3.

The optical unit 8 reads an image on the original S conveyed by the conveying device 7. The optical unit 8 is, for example, provided internally inside the housing of the reader main unit 4. The optical unit 8 includes a light source 12 and an image sensor 13. The light source 12 is a light emitting unit such as an LED, and irradiates light to the original S, which is an image reading target, via a reading window 14. The image sensor 13 receives reflected light irradiated by the light source 12 and reflected by the original S, and converts the received light into an electric signal to read image data. The image sensor 13 may be, for example, a CCD line sensor or the like, which is a linear image sensor (a one-dimensional image sensor) in which a plurality of photoelectric conversion elements that receive light and generate an electric charge are arranged in a line along the width direction (a longitudinal direction). In the optical unit 8, the arranged direction of the photoelectric conversion elements, that is, a longitudinal direction of the image sensor 13 is the scanning direction, and a direction orthogonal to the scanning direction, that is, a conveyance direction of the original S is the sub-scanning direction. The optical unit 8 optically scans an image on the original S by the image sensor 13, converts it into an electric signal to read it as image data, and transmits the read image data to the control device 6.

In the image reading apparatus 2, an image on the original S fed from the paper feed port 1 and conveyed by the conveying device 7 is read by the optical unit 8 per read line along the scanning direction. Because the original S continues a relative movement with respect to the image sensor 13 of the optical unit 8, the image reading apparatus 2 is able to sequentially read the image along the sub-scanning direction to finally read a two-dimensional image data on the original S.

The image reading apparatus 2 includes a shooter 15 at the paper feed port 1. The shooter 15 includes a guiding face 16 that guides the original S to the opening 9 of the paper feed port 1. Accordingly, because a leading end of the original S is guided to the opening 9 by the shooter 15, the paper feed port 1 allows the original S to be easily inserted into the opening 9 thereby improving the insertability of the original S. The shooter 15 is provided so that the guiding face 16 is substantially parallel to the conveying surface 11 and continuous to the conveying surface 11 on an upstream side in the paper feed direction. The shooter 15 is stowable, for example, by the guiding face 16 rotating to a position substantially vertical to the conveying surface 11, thereby enabling the image reading apparatus 2 to be compact when the image reading apparatus 2 is not being used.

The image reading apparatus 2 is able to switch between straight-lined conveyance and bent conveyance, for example, by opening or closing a guiding member 17 provided on a downstream side of the conveyance path 3 in the paper feed direction, that is, on a paper ejection side. For example, the image reading apparatus 2 is able to convey and eject the original S in a bent manner by expanding the guiding member 17 as illustrated by a one-dot chain line in FIG. 1, thereby enabling saving of an installation space equivalent to a paper ejection space of the original S. Further, the image reading apparatus 2 is able to linearly convey and eject the original S by storing the guiding member 17, thereby enabling to prevent an original S having relatively high stiffness or a thick original S from being damaged.

As depicted in FIG. 1, the paper feed port 1 and the image reading apparatus 2 according to the present embodiment are improved by appropriately forming a shape of the opening 9 of the paper feed port 1, so that the original S is able to be fed more infallibly and easily even when, for example, the original S has a so-called corner curl. The corner curl means a curled state of any one of corners at both ends of the original S in the width direction due to flexure or bending.

Specifically, in the paper feed port 1, an inclined surface 18 is provided in the opening 9 so that an abutting angle θ with respect to an end of the original S on the downstream side in the paper feed direction becomes an acute angle. The inclined surface 18 is formed on the housing of the reader main unit 4. The inclined surface 18 having the acute abutting angle θ with respect to the original S is provided at least at both ends of the opening 9 in the width direction. The inclined surface 18 is formed, extending along the width direction, and is provided over the entire width direction of the opening 9. The inclined surface 18 is shaped such that a distance along the height direction from the conveying surface 11 becomes gradually shorter (narrower) from the upstream side to the downstream in the paper feed direction.

More specifically, the abutting angle θ is an angle formed between the original S and the inclined surface 18 on the upstream side in the paper feed direction and on the opposite side of the conveyance path 3 (and of the conveying surface 11), at a contact portion between the leading end of the original S in the paper feed direction and the inclined surface 18, in a cross sectional view along the paper feed direction. That is, the inclined surface 18 is formed so that the abutting angle θ, which is an angle formed between the original S and the inclined surface 18 on the upstream side in the paper feed direction and on the opposite side of the conveyance path 3, becomes smaller than 90 degrees, in a cross-sectional shape along the sub-scanning direction.

Accordingly, in the paper feed port 1 and the image reading apparatus 2, because the inclined surface 18 is provided at least at the both ends of the opening 9 in the width direction, so that the abutting angle θ with respect to the original S becomes an acute angle, even if a corner curl is generated in the original S for example, it is possible to prevent a corner of the original S from being caught at the opening 9. As a result, in the paper feed port 1 and the image reading apparatus 2, the shape of the opening 9 is improved by the inclined surface 18, without separately providing another paper-feed guiding member or the like, and it is possible to improve the manual insertability of the original S into the opening 9, while suppressing a size increase of the apparatus, in other words, while downsizing the apparatus, and thus to feed an original more infallibly and smoothly to feed the original S more easily.

For example, when a user inserts the original S into the opening 9 by holding the original S with one hand, generally, the user tends to hold a central part of the original S, and thus, the both ends of the original S in the width direction may be bent. However, even if the original S is bent due to the holding of the original S with one hand, the paper feed port 1 and the image reading apparatus 2 are able to prevent a corner of the original S from being caught at the opening 9, as in the case where a corner curl is generated in the original S, and to make feeding of the original S easy.

Further, as depicted in FIGS. 2, and 4 to 9, the inclined surface 18 is shaped such that its edge on the upstream side in the paper feed direction protrudes toward the upstream side in the paper feed direction, from the both ends in the width direction toward the central part. In the inclined surface 18, when a protruding length of its edge on the upstream side in the paper feed direction toward the upstream side, based on a position of the edge on the upstream side in the paper feed direction at the both ends in the width direction is designated as protruding amount L, the protruding amount L changes according to a position in the width direction. That is, in the inclined surface 18, the protruding amount L gradually becomes larger from the both ends in the width direction toward the central part, thereby forming a front flange wall 19.

The front flange wall 19 is a wall surface continuous with the edge of the inclined surface 18 on the upstream side in the paper feed direction, and in this embodiment extends to an upper side (an opposite side of the conveyance path 3) of the inclined surface 18 along the height direction. In the front flange wall 19, its central part in the width direction protrudes toward the upstream side in the paper feed direction, and in this embodiment, forms a wall surface curved along the paper feed direction. In other words, the front flange wall 19 is shaped such that the edge of the inclined surface 18 on the upstream side in the paper feed direction retreats toward a downstream side in the paper feed direction as advancing toward the both ends in the width direction.

Figure 10:
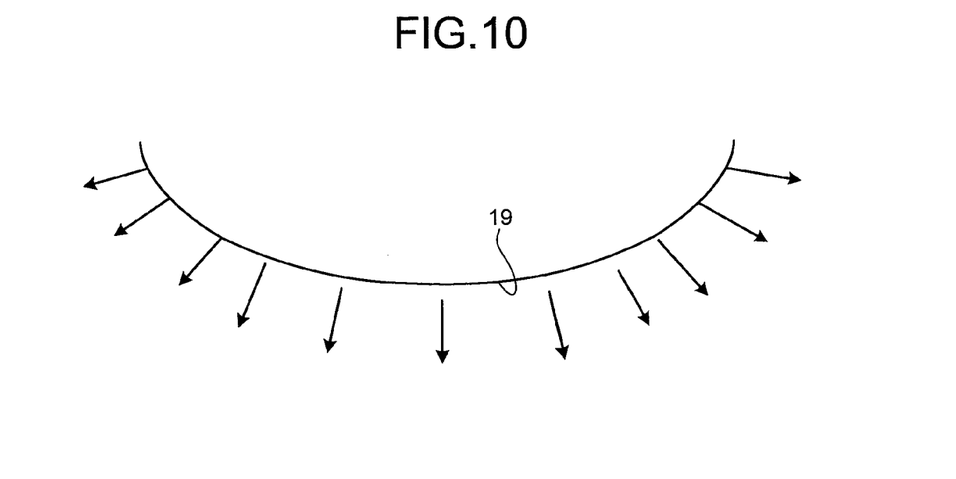
FIG. 10 is a schematic diagram for explaining an operation of a paper feed port according to the first embodiment.

Accordingly, in the paper feed port 1 and the image reading apparatus 2, for example, when the original S having a corner curl is inserted into the opening 9, a curled portion at a corner of the original S abuts against the front flange wall 19, and as this original S is moved toward the downstream side in the paper feed direction, the shape of the curled portion is corrected before the original S reaches the roller 10. That is, at this time, in the paper feed port 1 and the image reading apparatus 2, as the original S is pushed forward to the downstream side in the paper feed direction, a force pushing outward acts on the original S from the front flange wall 19, as illustrated by arrows in FIG. 10. Accordingly, the curl or flexure at the corner of the original S is pushed outward in the width direction and corrected (reformed). In the paper feed port 1 and the image reading apparatus 2, after the shape of the curled portion is corrected to an appropriate shape, the original S is conveyed between the outer circumferential surface of the roller 10 and the conveying surface 11. Therefore, in the paper feed port 1 and the image reading apparatus 2, the front flange wall 19 corrects the curl with respect to a curl of more than the height of the opening 9, thereby making it possible to correct a curl height of up to a height at which the abutting angle θ between the inclined surface 18 of the opening 9 and the original S becomes an acute angle. The front flange wall 19 is substantially in point contact with the original S when correcting the curl or flexure at the corner of the original S, whereas the inclined surface 18 of the opening 9 is substantially in line contact with the original S when correcting the curl or flexure at the corner of the original S. Therefore, the correction effect by the inclined surface 18 of the opening 9 is larger than the correction effect by the front flange wall 19.

As depicted in FIGS. 3, and 4 to 9, the inclined surface 18 is shaped such that a length from the conveyance path 3 side along the height direction becomes shorter as advancing from the both ends in the width direction toward the central part. In the inclined surface 18, when a length up to its upper edge (an edge opposite to the conveying surface 11 in the height direction) along the height direction, based on its lower edge in the height direction (an edge on the conveying surface 11 side in the height direction), is designated as height H, the height H changes according to a position in the width direction. That is, in the inclined surface 18, the height H gradually becomes shorter as advancing from the both ends in the width direction toward the central part. Accordingly, the inclined surface 18 is shaped such that the upper edge protrudes toward a lower side in the height direction (toward the conveying surface 11) at the central part in the width direction, while the lower edge is flat. In other words, the inclined surface 18 is curvedly shaped such that it is convex toward the upper edge in the height direction (the opposite side of the conveying surface 11) at the both ends in the width direction. That is, an interval along the height direction between the inclined surface 18 and the conveying surface 11 (the height of the opening 9) becomes narrower as advancing from the both ends in the width direction toward the central part.

Since a curl or the like is hardly generated for example in the central part of the original S in the width direction, in the paper feed port 1 and the image reading apparatus 2, the height H of the inclined surface 18 can be made shorter; in other words, the height of the opening 9 can be made shorter, as advancing from the both ends in the width direction toward the central part.

In the paper feed port 1 and the image reading apparatus 2, because the above front flange wall 19 is provided and the height H of the inclined surface 18 becomes shorter as advancing from the both ends in the width direction toward the central part, an inclination angle of the inclined surface 18 of the opening 9 can be made relatively small, as compared to a case in which the front flange wall 19 is not provided and the height H is not changed. The paper feed port 1 and the image reading apparatus 2 are able to improve the insertability in the central part in the width direction, which tends to be inserted with the original S first, and to improve the insertability of the original S more effectively without increasing the size of the apparatus. That is, the central part of the original S in the width direction tends to be inserted first into the opening 9. Therefore, by infallibly inserting the central part in the width direction into the opening 9, the abutting angle θ between the inclined surface 18 and the original S become an acute angle, and thus it is possible to increase an effect of suppressing the original S from being caught and removing the curl or flexure, and an effect of correcting the curl or flexure by pushing the original S outward in the width direction by the front flange wall 19.

According to the paper feed port 1 in the embodiment described above, in the paper feed port 1 for feeding the sheet-like original S to the conveyance path 3, the inclined surface 18 is provided at the both ends of the opening 9, into which the original S to be fed is inserted, in the width direction crossing the paper feed direction of the original S, so that the abutting angle θ to the end of the original S on the downstream side in the paper feed direction becomes an acute angle.

According to the image reading apparatus 2 of the present embodiment described above, the paper feed port 1 and the optical unit 8 that reads an image on the original S fed from the paper feed port 1 are included.

Therefore, because the inclined surface 18 is provided at least at the both ends of the opening 9 in the width direction so that the abutting angle θ with respect to the original S becomes an acute angle, it is possible to prevent a corner of the original S from being caught at the opening 9, and to make the feeding of the original S easy.

The paper feed port and the image reading apparatus according to the present invention are not limited to the embodiment described above, and various changes may be made within the scope described in the appended claims.

Figure 11:
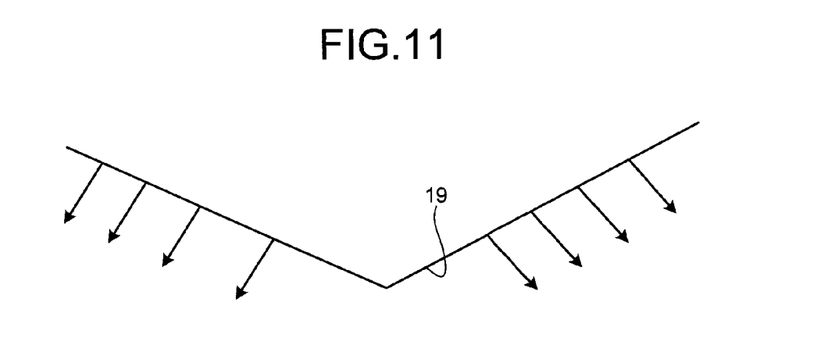
FIG. 11 is a schematic diagram of an image reading apparatus according to a modified example.

In the paper feed port 1 and the image reading apparatus 2, as depicted in a modified example in FIG. 11, the front flange wall 19 may be linearly shaped. That is, the front flange wall 19 may be V-shaped in which the central part in the width direction protrudes toward the upstream side in the paper feed direction.

In the above description, the shooter 15 has been explained to be provided so that the angle formed between the inclined surface 18 and the guiding face 16 becomes equal to the angle formed between the inclined surface 18 and the conveying surface 11, but it is not limited to this. That is, the paper feed port 1 and the image reading apparatus 2 may include the shooter 15 having the guiding face 16 that guides the original S to the opening 9, as illustrated by a modified example in FIG. 12, and the shooter 15 may be provided such that the guiding face 16 is inclined with respect to the conveying surface 11. That is, the shooter 15 may be provided such that an angle α formed between the inclined surface 18 and the guiding face 16 becomes smaller than an angle β formed between the inclined surface 18 and the conveying surface 11. The conveying surface 11 is a surface facing the inclined surface 18 along the height direction orthogonal to the paper feed direction and the width direction.

Figure 12:
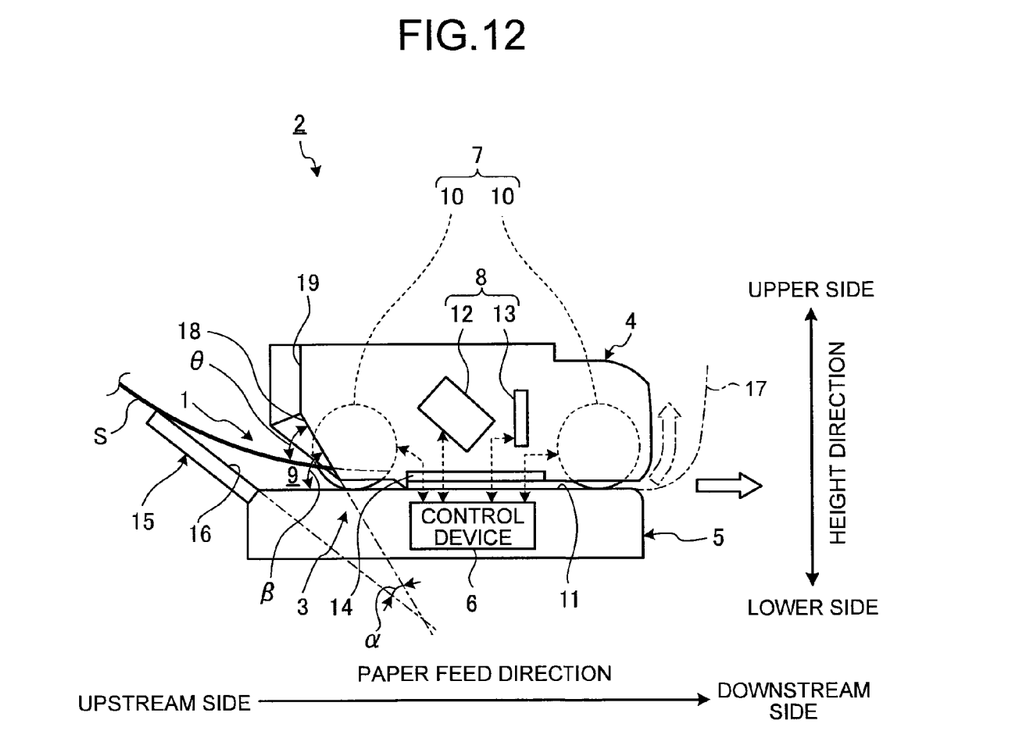
FIG. 12 is a schematic diagram of an image reading apparatus according to another modified example.

In this case, the paper feed port 1 and the image reading apparatus 2 are able to appropriately adjust an approach angle of the original S to the opening 9 by the guiding face 16 of the shooter 15, and to make the abutting angle θ formed between the original S and the inclined surface 18 an acute angle more infallibly. Accordingly, it is possible to suppress more infallibly a corner of the original S being caught at the opening 9.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medium feed port of an image reading apparatus for feeding a medium to a conveyance path of the image reading apparatus, the medium feed port comprising:
    an opening into which the medium is to be inserted to be fed to the image reading apparatus in a medium feed direction; and
    an inclined surface provided at both ends of the opening in a width direction which crosses the medium feed direction, the inclined surface protruding increasingly toward an upstream side in the medium feed direction as an edge of the inclined surface on the upstream side in the medium feed direction advances toward a central part of the inclined surface from both ends of the inclined surface in the width direction,
    wherein the inclined surface is configured to form an acute abutting angle with a leading end of the medium on a downstream side in the medium feed direction.

2. The medium feed port according to claim 1, further comprising:
    a front flange wall that is a wall surface continuous with the edge of the inclined surface on the upstream side in the medium feed direction, and extends to an upper side of the inclined surface along a height direction,
    wherein the front flange wall protrudes toward the upstream side in the medium feed direction at the central part of the inclined surface in the width direction.

3. The medium feed port according to claim 2, wherein the front flange wall protrudes toward the upstream side in the medium feed direction to form a V-shape at the central part in the width direction.

4. The medium feed port according to claim 1, wherein a length of the inclined surface from the conveyance path along a height direction orthogonal to the medium feed direction and the width direction becomes shorter, from both of the ends in the width direction toward the central part.

5. The medium feed port according to claim 1, further comprising:
    a shooter having a guiding face configured to guide the medium to the opening,
    wherein an angle formed between the inclined surface and the guiding face is smaller than an angle formed between the inclined surface and a conveying surface, the conveying surface facing the inclined surface in the conveyance path along a height direction orthogonal to the medium feed direction and the width direction.

6. The medium feed port according to claim 1, wherein the abutting angle is to be formed between the medium and the inclined surface on the upstream side in the medium feed direction and on an opposite side of the conveyance path.

7. An image reading apparatus, comprising:
    a medium feed port for feeding a medium to a conveyance path of the image reading apparatus; and
    a reader configured to read an image on the medium fed from the medium feed port,
    wherein the medium feed port comprises:
        an opening into which the medium is to be inserted to be fed to the image reading apparatus in a medium feed direction; and an inclined surface provided at both ends of the opening in a width direction which crosses the medium feed direction, the inclined surface protruding increasingly toward an upstream side in the medium feed direction as an edge of the inclined surface on the upstream side in the medium feed direction advances toward a central part of the inclined surface from both ends of the inclined surface in the width direction, wherein the inclined surface is configured to form an acute abutting angle with a leading end of the medium on a downstream side in the medium feed direction.

8. A paper feed port configured to feed a sheet-like medium to a conveyance path, the paper feed port comprising:

an inclined surface provided at both ends of an opening into which the medium to be fed is inserted, with respect to a width direction crossing a medium feed direction of the medium, such that an abutting angle between the inclined surface and a leading end of the medium on a downstream side in the medium feed direction is an acute angle; and a shooter having a guiding face configured to guide the medium to the opening, wherein the shooter is provided such that an angle formed between the inclined surface and the guiding face is smaller than an angle formed between the inclined surface and a conveying surface facing the inclined surface.

* * * * *